United States Patent [19]

Barletta et al.

[11] Patent Number: 4,525,713
[45] Date of Patent: Jun. 25, 1985

[54] ELECTRONIC TAG IDENTIFICATION SYSTEM

[75] Inventors: Joseph M. Barletta, Bridgewater; John P. Yang, Belle Mead, both of N.J.

[73] Assignee: Lockheed Electronics Co., Inc., Plainfield, N.J.

[21] Appl. No.: 470,924

[22] Filed: Mar. 1, 1983

[51] Int. Cl.³ .......................... H04Q 9/00; G06K 7/00
[52] U.S. Cl. .......................... 340/825.54; 340/825.35; 235/442; 235/492
[58] Field of Search ...................... 340/825.54, 825.35, 340/825.83; 235/440–443, 385, 438, 492, 439, 494, 489

[56] References Cited

U.S. PATENT DOCUMENTS

| | | | |
|---|---|---|---|
| 3,732,542 | 5/1973 | Hedin | 340/825.32 |
| 4,216,375 | 8/1980 | Ulch et al. | 235/382 |
| 4,336,449 | 6/1982 | Perry | 235/438 |
| 4,473,825 | 9/1984 | Walton | 340/825.54 |
| 4,481,513 | 11/1984 | Mole et al. | 340/825.31 |

FOREIGN PATENT DOCUMENTS 2353103 12/1977 France ............................ 340/825.31

Primary Examiner—Donald J. Yusko
Attorney, Agent, or Firm—Hopgood, Calimafde, Kalil, Blaustein & Judlowe

[57] ABSTRACT

A plurality of differently coded component tags are attached to a plurality of components maintained in a storage location. The component tag codes are stored in a master tag which can be interrogated by a coded interrogation signal to identify the tagged components.

7 Claims, 7 Drawing Figures 4,525,713

ELECTRONIC TAG IDENTIFICATION SYSTEM

The present invention relates generally to identification systems, and more particularly to an electronic identification system for identifying components maintained in a population of such components.

Electronic identification systems for identifying components present in a group are in use, for example, to take inventory of a plurality of items maintained in a stock room or the like. In one known electronic identification system disclosed in U.S. Pat. No. 4,242,663, assigned to the assignee of this application, an electronic tag is secured to each of a plurality of items which are to be identified. Each of the electronic tags in that system contains a battery, an rf transmitter, and an antenna along with logic circuitry to produce a coded rf signal that is unique to the tag and thus to the item to which the tag is secured. The coded rf signals generated by the individual electronic tags are received by and processed in a transceiver, thereby to identify the tagged items in accordance with the received coded signals.

Although the electronic identification system disclosed in the aforesaid patent is effective to identify accurately and quickly the tagged components, the need in that system to employ a plurality of relatively costly and bulky electronic tags has limited the use of this identification system, particularly in those applications in which a large number of items are to be identified.

It is therefore an object of this invention to provide an improved electronic identification system in which the identifying tags are less costly and smaller than those used in prior electronic identification systems.

It is a further object of the invention to provide a lower-cost electronic identification system, which employs passive and relatively inexpensive component-identifying tags.

To these ends, the electronic identification system of the invention includes a single master tag, which includes a memory, an rf transceiver and associated logic circuitry. Each of the plurality of items to be identified has attached thereto an associated passive and differently coded component tag. The different codes of each of the component tags are stored in the memory of the master tag, which, when interrogated by an external transceiver, produces a series of coded rf signals corresponding to the codes on the component tags stored in its memory, and transmits correspondingly coded rf signals to the interrogation transceiver at which the coded rf signals are processed to identify each of the tagged components.

To the accomplishment of the above and to such further objects as may hereinafter appear, the present invention relates to an electronic identification system substantially as defined in the appended claims and as described in the following specification, as considered with the accompanying drawings in which:

Figure 1:
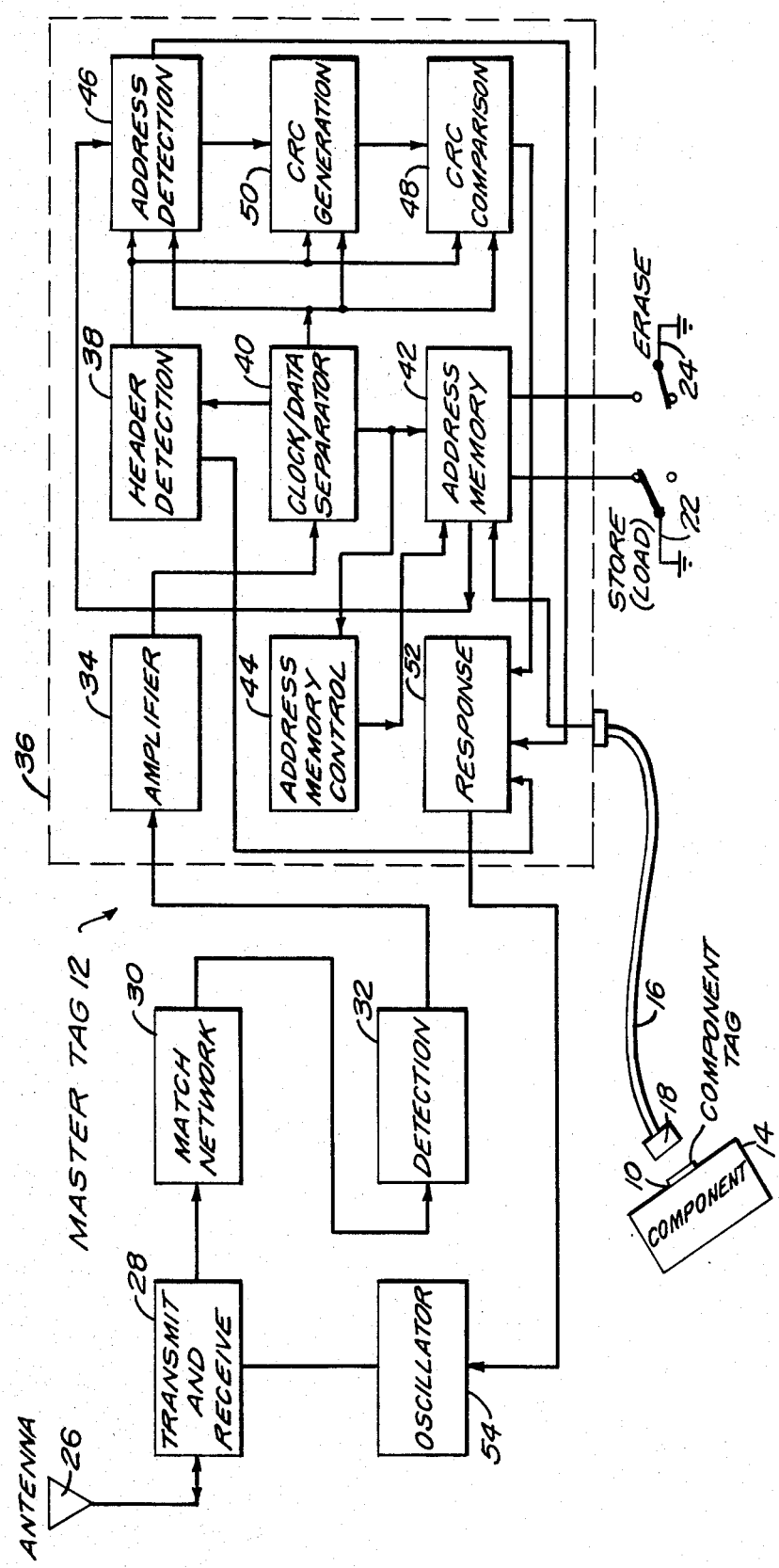
FIG. 1 is a schematic block diagram of a master tag as used in an embodiment of the electronic identification system of the invention and also illustrating the manner in which the code on a component tag is stored in the master tag.

The electronic identification system of the invention includes a plurality of passive, coded component tags 10 which operate in conjunction with a single, active master tag 12. As shown in FIG. 1, one component tag 10 is attached to each component or item 14 in a population to be monitored, which may be, for example, one of a plurality of components maintained in inventory such as in a storage room or stock room. Each of the component tags 10 is uniquely coded to identify uniquely the component 14 on which it is attached.

To store the code from a component tag 10 into the master tag 12 whenever a new component is placed in inventory or storage, an adaptor 18 mounted on one end of a cable 16 is placed over the component tag secured to the component and the other end of the cable is connected to the input of the master tag, thereby to cause the code of that component tag to be inserted and stored in a memory in the master tag 12 in a manner described in greater detail below. This process is repeated each time a new tagged component 14 or group of such components is added to inventory. Similarly, when a component is removed from inventory or storage, the cable adaptor 18 is again connected to the component tag on the component that is to be removed, thereby to modify the codes stored in the master tag memory, also as discussed in greater detail below.

The master tag 12, as illustrated schematically in FIG. 1, includes a transmit receiver antenna 26, which receives a sequentially coded rf interrogation signal from an external master transceiver or interrogator (not shown), which may be of the type disclosed in the aforesaid patent, the description of which is incorporated herein. The master tag 12 receives and detects the received coded signals from the master transceiver and compares them with the component tag codes stored in its memory. For each positive comparison of a received interrogation code and a stored component tag code, the master tag transmits a recognition signal to the master transceiver, which records each matching code, thereby to identify each coded component contained in inventory associated with that master tag.

The antenna 26 in the master tag is connected to a transmit/receiver circulator or control 28, which controls the direction of conduction of an rf signal either to or from the antenna 26 to the remainder of the master tag. The output of the transmit/receiver control 28 is connected to an impedance match network 30, the output of which is, in turn, connected to a detection circuit 32. The latter detects and removes the received coded interrogation signal from its received carrier and applies the detected binary signal to an amplifier 34, which may, as shown, be included in an integrated circuit 36.

Figure 3:
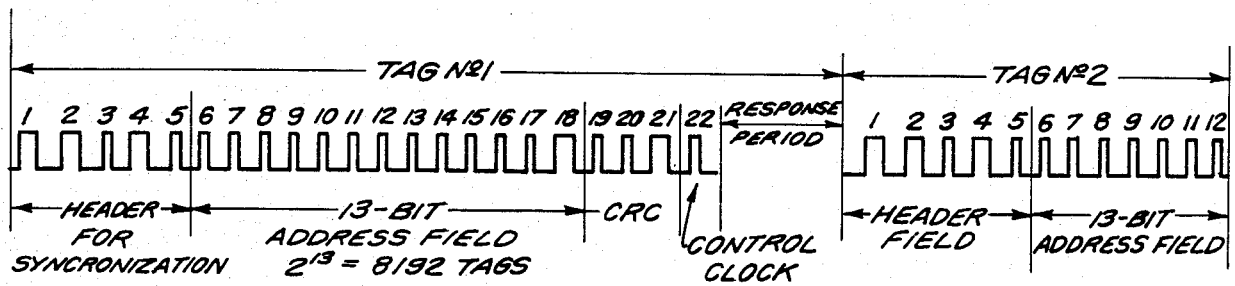
FIG. 3 is a typical format of a coded interrogation signal which may be used in the electronic identification system of the invention.

As shown in FIG. 3, the two binary levels "1" and "0" of the received multi-bit binary interrogate signal may be in the form of pulses of two different pulse widths. As also seen in FIG. 3 and as described in greater detail below, the incoming binary sigal may include an initial 5-bit header or synchronization signal followed by a 13-bit address or component tag signal followed by a three-bit cyclic redundancy check (CRC) error-detection code and a one-bit clock. The 13-bit signal corresponds to one of the $2^{13}$ or 8,192 possible component tag codes that are interrogated. A response period or interval is provided between succeeding 16-bit interrogation signals, and the next interrogation signal includes a header code, a (CRC) signal, and a different 13-bit address code.

Also included in the master tag integrated circuit 36 is a header detect circuit 38, which detects the header or interrogation request multi-bit signal from the received binary coded interrogate signal, thereby to indicate to the master tag that an interrogation or inventory procedure has been initiated. The detected and amplified code signal is also applied to a clock/data separator 40, which generates timing clock signals from the received data in the manner disclosed in co-pending application Ser. No. 447,956, assigned to the asignee of the present application, and applies those signals to the header detect circuit 38 and to an address memory 42, which contains the stored address codes from each of the component tags associated with that master tag. Address memory 42 is also connected to an address memory control 44, which, as described below, controls the storage of component codes in the memory and is also connected to the cable 16 and to store switch 22 and erase switch 24.

The clock pulses produced in clock/data separator 40 are also applied to an address detect 46, which is connected to address memory 42 as well as to the header detect 38 and to a CRC comparator 48. The output signals from the header detect 38 and the address detect 46 are applied to a CRC generator 50, which also receives signals from the clock/data separator 40 and the address detect circuit 46.

The outputs of the header detect 38, address detect 46, and CRC comparator 48 are all applied to a response circuit 52. When a match or identification is respectively made in those circuits of a header, address or tag code signal, and CRC signal, the response circuit 52 produces a response signal, which is applied to an oscillator 54 to actuate the latter. The output of oscillator 54 is passed through the transmit/receiver circuit 28 to the master tag antenna 26, which thereupon transmits, during the response period between received interrogation codes, a code match or component-identification signal to the interrogator.

Figure 2:
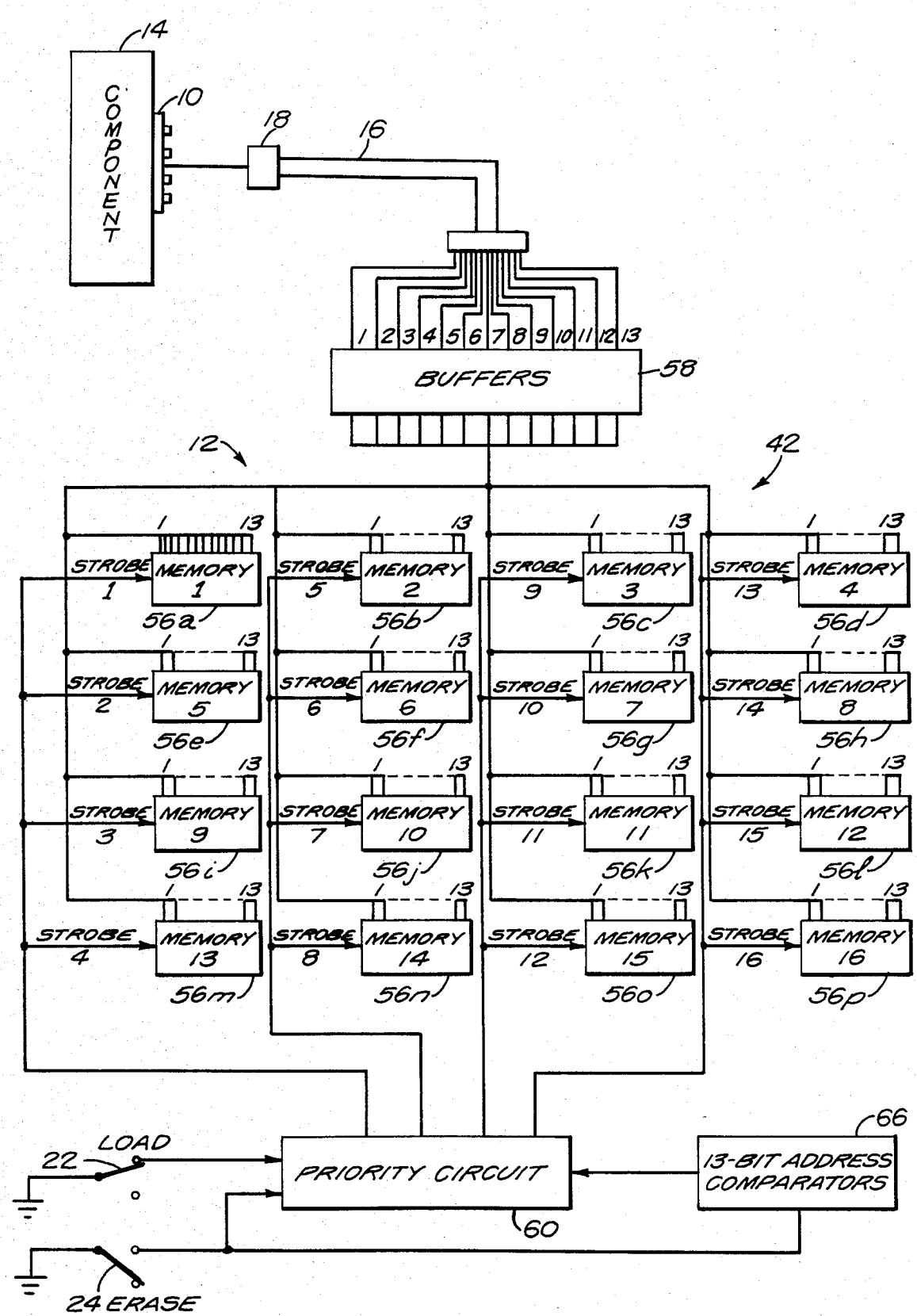
FIG. 2 is a detailed schematic block diagram of the memory section of the master tag of FIG. 1.

FIG. 2 illustrates in greater detail the address memory 42 of the master tag 12, which, in the exemplary embodiment shown, includes a plurality of (sixteen) memory address registers 56a-56p connected to the inboard end of cable 16 through a buffer 58. The address registers 56 are loaded when the component tags are first installed on the stored components, or when new tagged components are placed in inventory. A priority circuit 60 contained in address memory control 44 provides strobe signals to each of the memory address registers 56, and also receives the load and erase pulses whenever the load switch 22 or erase switch 24 is operated. The priority circuit 60 also receives a pulse from the 13-bit address comparator 66 in the memory-erase mode, as described below.

To load the 13-bit tag address code from the component tags into the registers 56 of address memory 42, the code is read from the component tag 10 and is applied through the cable 16 and the buffer 58, and is then sent to all sixteen memory address registers 56. When the load switch 22 is depressed, it generates a pulse which is applied to priority circuit 60 for priority resolving of the registers. Each memory address register 56 is assigned an enable register (not shown) all of which are reset at initialization. When a load pulse is applied to the priority circuit 60, initially only the enable 1 register is set and the other registers are blocked from setting so that only a strobe 1 signal is produced by priority circuit 60. That strobe signal is applied to register 56a and loads the 13-bit tag address from the cable into the memory register 56a. During this operation no strobe signal is applied to any of the other memory registers, which are accordingly not set.

When the next, or second, 13-bit tag address is sent in from the cable, the load switch 22 is again activated and a load pulse is again sent to priority circuit 60. This time the enable 2 register is set and a strobe 2 signal is sent out to the memory register 56b, and loads the 13-bit address into the latter. The process is repeated until all of the registers 56 are set or until the codes from all the components are stored in the master tag memory 42.

Figure 4:
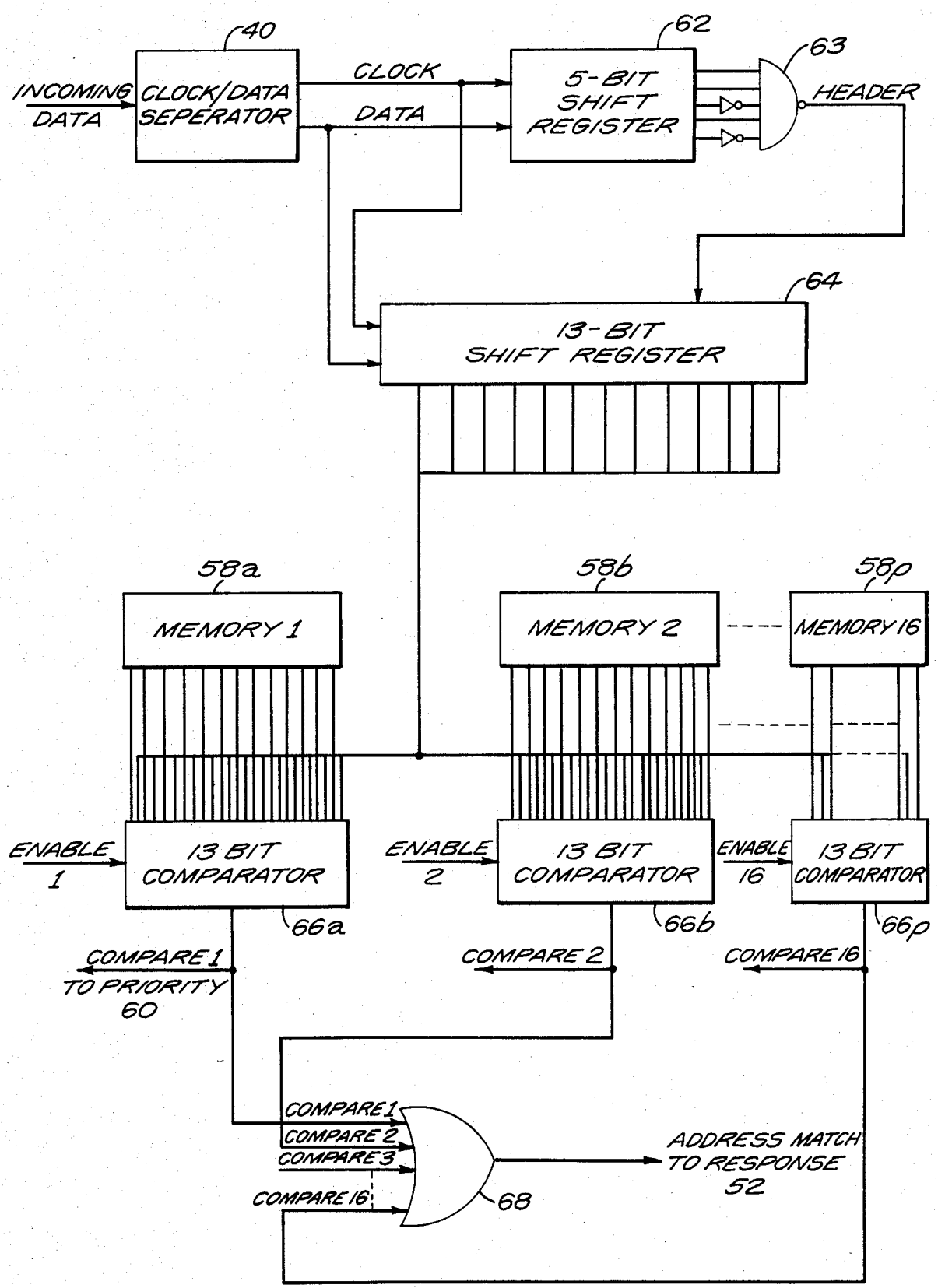
FIG. 4 is a more detailed schematic diagram of another section of the master tag of FIG. 1.

The operation of the address detect circuit 46 is now described with reference to FIG. 4, for the condition in which all sixteen memory address registers 56 are loaded in the manner indicated previously. When a serial data signal of the type illustrated in FIG. 3 is received and detected in the master tag, the clock-data separator 40 extracts data "1" pulses from the serial data in the manner described in said co-pending application. The separated clocks and "1" data signals are sent to a 5-bit shift register 62 in header detect circuit 38 where the header 5-bit header code, which may be, as shown in FIG. 3a, "11010" signal, is detected. When the header code is detected, a header signal is produced at the output of NAND gate 63 to the 13-bit shift register 64 for initialization and waiting for the 13-bit code address.

When 13 bit clocks are applied to shift register 64, a data one is strobed into the shift register for data "1" and a zero is strobed into the 13-bit shift register for data "0". The shift register 64 converts the 13-bit serial address signal into a 13-bit parallel address which is compared with each address stored in the memory address registers 56 in a corresponding plurality (sixteen) of 13-bit comparators 66a-66p, which are operated in parallel. If any of the address codes stored in the address memory registers 56 matches the received 13-bit tag address code signal, a compare signal is applied to one input of an OR gate 68, which, in turn, generates an address match signal that is applied to response circuit 52. The compare signal is also applied to priority circuit 60.

The CRC code signal contained in the serial data signal is the cyclic redundancy check error detection and correction code. For each 13-bit tag address, a 3-bit CRC code is generated with a special algorithm by the interrogator and is transmitted immediately after the 13-bit address code. The master tag has the same CRC generator code developed in the CRC generator 50 as that of the interrogator. When the master tag receives an address, it calculates the CRC bit by bit, and at the end of the last address bit, the CRC code is recalculated. The 3-bit CRC code is applied to the CRC comparator 48, which starts to compare the three CRC bits. If they match, no CRC error exists, which indicates to the master tag that the 13-bit address received is correct. If the CRC bit does not compare, a CRC error is flagged and disables the response signal. A response signal is thus produced by response circuit 52 only when:

1. The header code, as determined in header detect 38, is correct.
2. The 13-bit tag address, as determined by the 13-bit address comparator 66 in address detect 46, is correct.
3. The CRC code, as determined in CRC comparator 48, is correct.

As noted above, once a response signal is produced by the response circuit 52, oscillator 54 is actuated, thereby to transmit back to the interrogator a component identification signal, which is processed at the interrogator.

When an address stored in any of the memory address registers 56 needs to be erased, as when a component is removed from inventory, the erase switch 24 is switched on and remains on during the erase operation. The adaptor end of the cable 16 is connected to the component tag 10 of the component being removed to read out the 13-bit address contained in that component tag. This 13-bit signal is compared by each of the sixteen comparators 66 to produce a compare signal, which is gated with the load pulse produced by depressing the load switch 22 to generate a signal to clear the enable register, thus preventing further comparison of the address code for the next incoming serial data. It will be noted that the address code for the removed component tag that is stored in the memory address register is really not cleared, but rather is disabled from address comparing. That is, the old address remains stored in this memory address register.

Figures 5, 6:
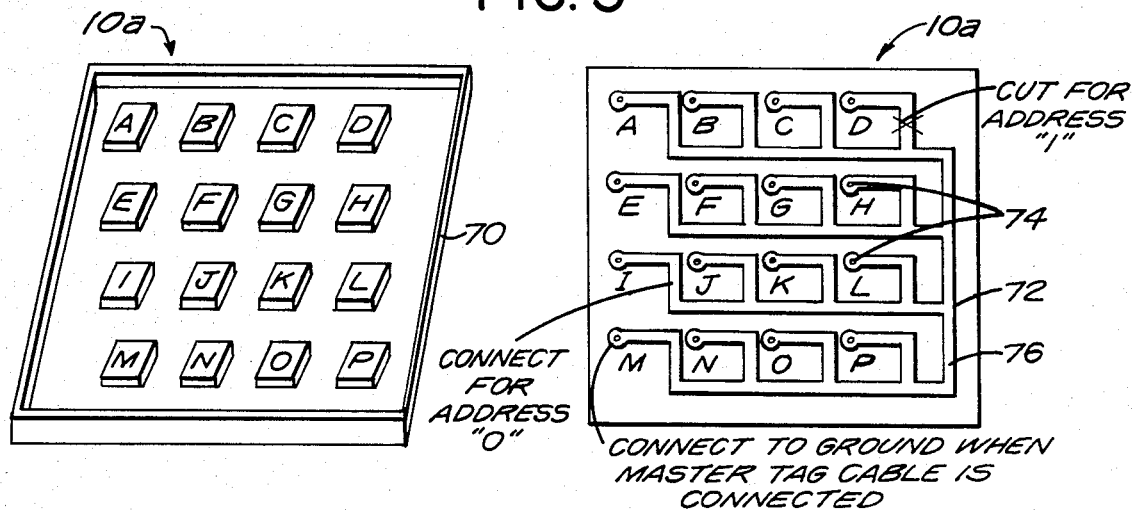
FIG. 5 is a perspective of the upper face of one embodiment of a component tag that can be used in the electronic identification system of the invention.
FIG. 6 is an elevation of the reverse face of the component tag of FIG. 5.

FIGS. 5 and 6 illustrate one presently preferred embodiment of a low-cost passive component tag 10a that can be used in the electronic identification system of the invention. As shown in FIG. 5, the component tag includes an insulating base 70 on which a plurality (here sixteen) metal contacts A–P are installed on the upper surface. The underside of the base 70, as shown in FIG. 6, includes a printed circuit wire 72 printed thereon which is connected by means of through holes 74 to the metal contacts A–P on the opposite side of the base. The printed circuit wire 72 includes a continuous part 76 with individual branches 78 extending to each of the through holes.

To code the component tag with one of the possible unique 13-bit address codes, one or more of the branches 78 is cut or broken to establish a logic "1" for its associated contact. Thus, as shown in FIG. 6, the branch associated with contact D is broken so that a logic "1" is established for the D contact, whereas all other contacts are at a logic "0" condition. When the cable adaptor is connected to the component tag and the load switch 22 is operated, the M contact is connected to ground at the master tag end of the cable, and all contacts for which the branch section is not cut will also be at ground for a logic "0" condition. Each contact whose branch is cut, as contact D in FIG. 3, floats with respect to ground when the master tag cable is connected to the component tag, thereby to establish, as noted, a logic "1" condition at the receiving end of the cable, which for this purpose, may have a pull-up resistor connected to a battery power source.

In order to produce a 13-bit address code, only thirteen of the sixteen contacts in the component tag are used. An additional contact is used for ground and two are not used in this embodiment, but may be reserved for further expansion, if desired.

Figure 7:
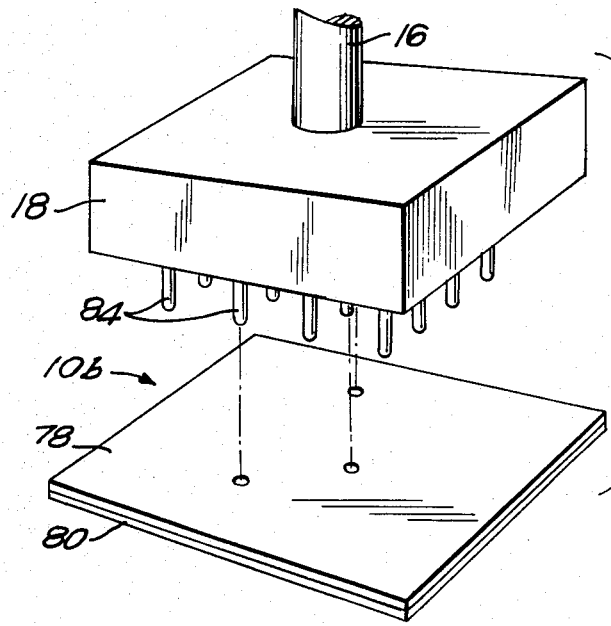
FIG. 7 is a perspective of another embodiment of a component tag that can be used in the electronic identification system of the invention.

FIG. 7 illustrates a second embodiment of a component tag 10b for use in the electronic identification system of the invention. As shown, component tag 10b includes an upper conducting plate 78 affixed to a lower insulating plate 80. A plurality of holes 82 are formed through the conducting plate 78 at selected locations in a 4×4 matrix in accordance with the component identifying code that is to be implemented in that component tag. As also shown, the cable adaptor 18 includes a plurality (here 16) spring-loaded pins 84, spaced so that certain of the pins can fit in and extend through the openings 82 in the component tag 10b.

When it is desired to "read" the code of the component tag 10b and to store it into the memory of the master tag 12, the adaptor 18 is placed over the component tag so that certain of the pins 84 extend through the openings 82 in the component tag but do not contact the conducting plate 78, whereas the pins 84 at locations other than where the holes 82 are formed in the conducting plate are caused to retract under the force of the springs (not shown) and contact the surface of the metal plate.

The conducting plate 78 constitutes a ground so that the pins 84 that pass through the holes 82 and engage the insulating plate 80 are floating with respect to ground and represent logic "1"s, whereas the pins 84 which do not pass through openings and contact the conducting plate 78 are at ground and represent logic "0"s. Thus, the master tag 10b can be programmed to form a unique component-identifying code by the location of the holes in the conducting plate 78, and that code can be "read" and stored in the master tag memory by connecting the cable to the master tag much as in the manner described above with respect to the component tag 10a.

It will thus be noted that various forms of the component tag have been described for purpose of example, and that other forms of programmable component tags may be employed from which the codes can be "read" and stored in the master tag memory. It will also be understood that other modifications to the embodiments of the invention hereinabove specifically described may be made without necessarily departing from the spirit and scope of the invention.

What is claimed is:

1. An electronic component-identification system for use in identifying a plurality of components, said system comprising a plurality of differently coded passive component tags adapted to be respectively secured to said plurality of components, a master tag including a memory, a transceiver for receiving a coded interrogation signal, means for storing the different codes from said plurality of component tags in said memory of said master tag, said master tag further comprising logic means for comparing the codes stored in said memory with the coded interrogation signal received at said master tag from said transceiver and for producing a component-identification signal for each matching code comparison, and means for applying said component-identification signal to said transceiver for transmission to a remote station.

2. The system of claim 1, in which each of said component tags including a surface and a plurality of electrical conducting paths on said surface, said paths being differently and selectively altered in each of said component tags, thereby to establish a different multi-digit binary code on each of said component tags.

3. The system of claim 1, in which said memory includes a plurality of memory stages, said master tag further comprising means for selectively applying the codes from said component tags into corresponding ones of said memory stages.

4. The system of claim 3, in which said comparing means comprises a plurality of comparators for respectively comparing the component tag codes stored in a corresponding plurality of memory stages with a received tag address code, and means for producing a match signal whenever one of the stored codes corresponds to the received address code.

5. The system of claim 1, in which said master tag includes a normally inoperative oscillator, and comprises means responsive to the production of said component-identification signal for actuating said oscillator, thereby to cause said master tag to transmit a signal to a remote unit.

6. The system of claim 5, in which said memory includes a plurality of memory stages, said master tag further comprising means for selectively applying the codes from said component tags into corresponding ones of said memory stages.

7. The system of claim 6, in which said comparing means comprises a plurality of comparators for respectively comparing the component tag codes stored in a corresponding plurality of memory stages with a received tag address code, and means for producing a match signal whenever one of the stored codes corresponds to the received address code.

* * * * *